(12) United States Patent
Hochberg et al.

(10) Patent No.: US 11,972,050 B2
(45) Date of Patent: Apr. 30, 2024

(54) BRAIN COMPUTER INTERFACE (BCI) SYSTEM THAT CAN BE IMPLEMENTED ON MULTIPLE DEVICES

(71) Applicants: BROWN UNIVERSITY, Providence, RI (US); THE GENERAL HOSPITAL CORPORATION, Boston, MA (US); The United States Government as represented by the Department of Veterans Affairs, Washington, DC (US)

(72) Inventors: Leigh Hochberg, Brookline, MA (US); John D. Simeral, Providence, RI (US); Tyler Singer-Clark, Falmouth, MA (US); Ronnie Gross, Portsmouth, RI (US); Thomas Hosman, Providence, RI (US); Anastasia Kapitonava, Boston, MA (US); Rekha Crawford, Providence, RI (US)

(73) Assignees: BROWN UNIVERSITY, Providence, RI (US); THE GENERAL HOSPITAL CORPORATION, Boston, MA (US); THE UNITED STATES GOVERNMENT AS REPRESENTED BY THE DEPARTMENT OF VETERANS AFFAIRS, Washington, DC (US)

( * ) Notice: Subject to any disclaimer, the term of this patent is extended or adjusted under 35 U.S.C. 154(b) by 0 days.

(21) Appl. No.: 17/978,271

(22) Filed: Nov. 1, 2022

(65) Prior Publication Data
US 2023/0133022 A1 May 4, 2023

Related U.S. Application Data

(60) Provisional application No. 63/274,133, filed on Nov. 1, 2021.

(51) Int. Cl.
*G06F 3/01* (2006.01)

(52) U.S. Cl.
CPC .................................... *G06F 3/015* (2013.01)

(58) Field of Classification Search
CPC ....................................................... G06F 3/015
(Continued)

(56) References Cited

U.S. PATENT DOCUMENTS 7,120,486 B2   10/2006   Leuthardt et al.
8,386,050 B2   2/2013   Donoghue et al.
(Continued)

FOREIGN PATENT DOCUMENTS

WO   2011140303 A1   11/2011

*Primary Examiner* — Calvin C Ma
(74) *Attorney, Agent, or Firm* — TAROLLI, SUNDHEIM, COVELL & TUMMINO L.L.P.

(57) ABSTRACT

Instances of a single brain computer interface (BCI) system can be implemented on multiple devices. An active instance can control the associated device. The instances can each communicate with a neural decoding system that can receive neural signals from a user, process the neural signals, and output a command based on the processed neural signals. A device running the active instance of can be in communication with the neural decoding system to receive a command. The device can include a display, a non-transitory memory storing instructions, and a processor to execute the instructions to: run an instance of a control program; and execute the task based on the command.

18 Claims, 10 Drawing Sheets

(58) Field of Classification Search
USPC .......................................................... 345/156
See application file for complete search history.

(56) References Cited

U.S. PATENT DOCUMENTS

| | | | |
|---|---|---|---|
| 10,275,027 B2 | 4/2019 | Segal | |
| 11,231,779 B1* | 1/2022 | Sundberg | ................ G06F 3/016 |
| 2011/0184559 A1 | 7/2011 | Benabid | |
| 2016/0299568 A1 | 10/2016 | Segal | |
| 2021/0005104 A1 | 1/2021 | Levenberg | |
| 2022/0107686 A1* | 4/2022 | Baba | ........................ G06F 1/163 |

\* cited by examiner

```
                    ┌────────────────────────────────────────────────────────┐
                    │ RECEIVE A COMMAND TO CHANGE AN OPERATION OF THE DEVICE │
                    │                     AND/OR THE GUI                     │
                    │  92                                                    │
                    └────────────────────────────────────────────────────────┘
                                               │
                                               ▼
                    ┌────────────────────────────────────────────────────────┐
                    │              DISPLAY A CONFIRMATION GRAPHIC            │
                    │  94                                                    │
                    └────────────────────────────────────────────────────────┘
                                               │
                                               ▼
                    ┌────────────────────────────────────────────────────────┐
                    │   IF RECEIVE CONFIRMATION, THEN PROCEED WITH CHANGE    │
                    │   IF NO CONFIRMATION, THEN CANCEL THE CHANGE           │
                    │  96                                                    │
                    └────────────────────────────────────────────────────────┘
```

FIG. 7

BRAIN COMPUTER INTERFACE (BCI) SYSTEM THAT CAN BE IMPLEMENTED ON MULTIPLE DEVICES

RELATED APPLICATIONS

This application claims priority to U.S. Provisional Application Ser. No. 63/274,133, filed Nov. 1, 2021, entitled "BRAIN COMPUTER INTERFACE (BCI) SYSTEM THAT CAN BE IMPLEMENTED ON MULTIPLE DEVICES". The entirety of this application is hereby incorporated by reference for all purposes.

GOVERNMENT FUNDING STATEMENT

The present invention was made with government support under Grant No. NIDCD U01 DC017844 awarded by the National Institutes of Health and Grant No. A2295R awarded by the U.S. Department of Veterans Affairs. The US government has certain rights in this invention.

TECHNICAL FIELD

The present disclosure relates to brain computer interface (BCI) systems, and, more specifically, to a BCI system that can be implemented on multiple devices and methods for using the BCI system.

BACKGROUND

Previous brain computer interface (BCI) systems have been leveraged to enable people with paralysis to control a single device. For example, a given BCI system can allow a paralyzed individual to have limited control of a desktop PC, a tablet, or a robotic arm, but only the one specific device. The user cannot select among different devices to use. Rather, to control multiple devices, the paralyzed individual needs multiple previous BCI systems and the support of a technician to switch control to a different device. Traditional BCI systems have enabled a small number of decoded commands to execute a specific set of functions on a given device only.

SUMMARY

Provided herein is a single brain computer interface (BCI) system that can be implemented on multiple devices and methods for using the BCI system. For example, the multiple devices may include at least one computing device with a display that can implement a graphical user interface (GUI) and/or cursor and an instance can be used to control the computing device. As another example, the multiple devices may include at least one apparatus without a display that can implement a GUI and/or cursor (e.g., certain tablet computing devices, certain robotic devices, and the like) that can be associated with a computing device with a display and/or cursor and control of the apparatus can be performed using an instance implemented on the computing device with the display/cursor.

In one aspect, the present disclosure includes a single BCI system that can be implemented on multiple devices. The BCI system can be implemented as multiple instances to control multiple devices. Regardless of which devices instances of the control portion of the BCI system are implemented on, the instances can each communicate with a neural decoding system that can receive neural signals from a user, process the neural signals, and output a command based on the processed neural signals. However, each instance can be implemented on an active device (one device in the system) or an inactive device (other devices in the system) such that a single device and instance in the system are active at a time with all other instances being inactive. For example, an active device running an active instance can be in communication with the neural decoding system to receive a command. Each device can include a display, a non-transitory memory storing instructions, and a processor, the display can be optional in certain examples (e.g., device includes a robotic apparatus). When active, the processor can execute the instructions to: run an instance of a control program, wherein the instance of the control program comprises a graphical user interface (GUI) that covers at least a portion of the display and a cursor; and execute the task based on the command using the cursor and/or the GUI. It should be understood that the active device can change and the instance of the control program associated with the newly active device can become active.

In another aspect, the present disclosure includes a method for using the BCI system. The BCI system can include multiple devices, each running an instance of a control program of a BCI system. The device can be active or inactive and the instance of the control program indicative of the status. One instance can be active in the system at a time. The active instance can be started on an active device in communication with a neural decoding system. The instance can include a GUI and a cursor. The neural decoding system can receive neural signals from a user. The neural decoding system can decode the neural signals into commands, which can be sent to the active instance of the control program. The active instance can receive the command based on the neural signals from the neural decoding system. The command is for the cursor and/or the GUI to complete a task. The task can be executed on the device by the cursor and/or the GUI based on the command. As previously noted, it should be understood that the active device can change and the instance of the control program associated with the newly active device can become active.

BRIEF DESCRIPTION OF THE DRAWINGS

The foregoing and other features of the present disclosure will become apparent to those skilled in the art to which the present disclosure relates upon reading the following description with reference to the accompanying drawings, in which:

FIG. 7 shows an example process flow diagram of a method for implementing a task on a device with an instance of a BCI;

DETAILED DESCRIPTION

I. Definitions

Figure 1:
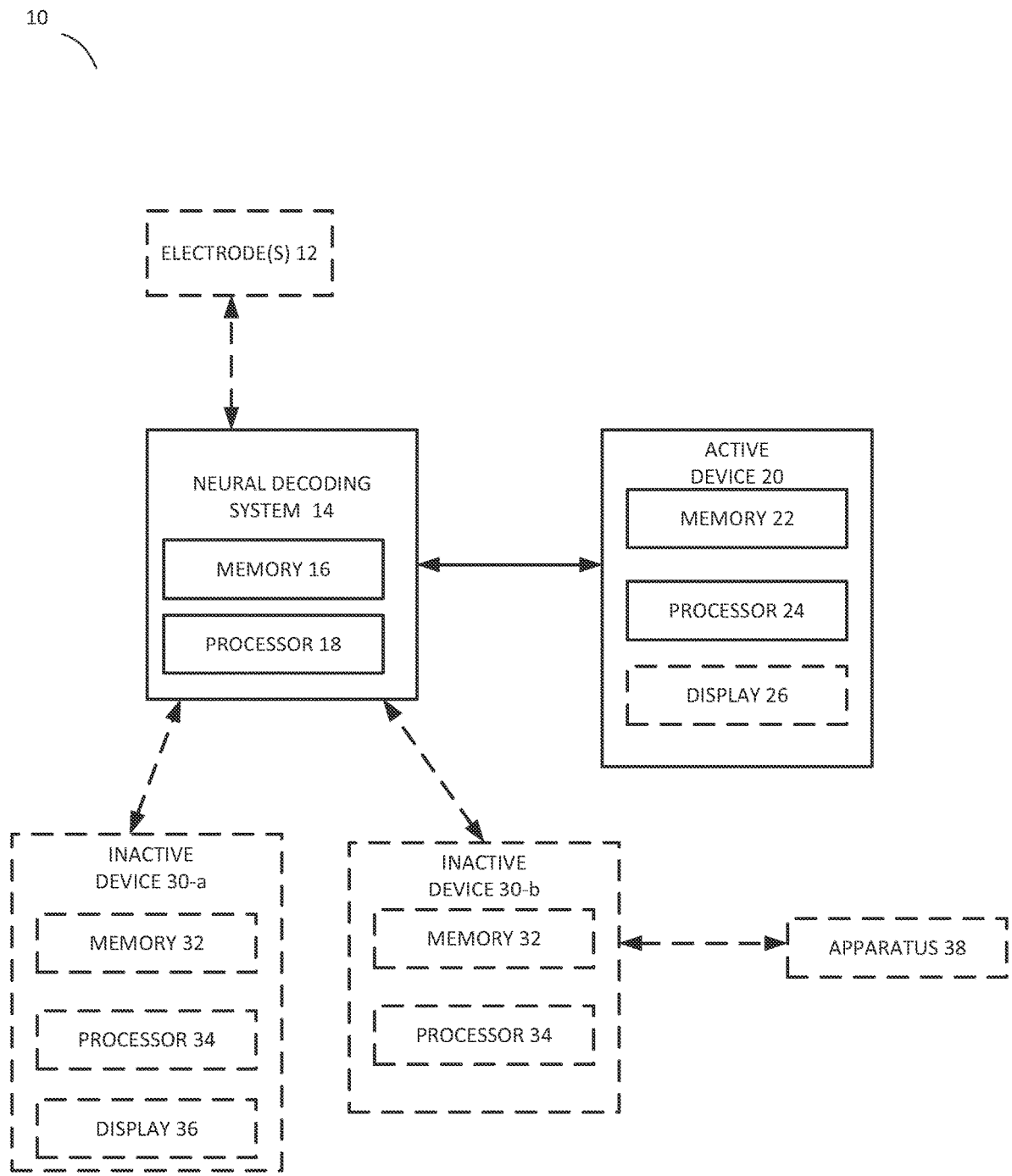
FIG. 1 shows a brain computer interface (BCI) system that can be implemented on multiple devices.

Unless otherwise defined, all technical terms used herein have the same meaning as commonly understood by one of ordinary skill in the art to which the present disclosure pertains.

As used herein, the singular forms "a," "an" and "the" can also include the plural forms, unless the context clearly indicates otherwise.

As used herein, the terms "comprises" and/or "comprising," can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "brain computer interface (BCI)" refers to a system that determines functional intent directly from brain activity. The BCI system includes a control program with instances implemented on one or more devices in communication with a neural decoding system that determines the functional intent from the brain activity. A task is performed by the instance of the control program implemented on/by an active device based on the functional intent. An example of a BCI is an intracortical BCI, which refers to a BCI that detects neural signals from the cerebral cortex of the brain, including, but not limited to, the motor cortex, speech-generating and language-generating cortex, the somatosensory cortex, and the visual cortex.

The BCI system can be associated with devices and active/inactive instances of a control program to change, move, control, or interact with something in/on the one or more devices and/or the surrounding environment of a user. For example, the multiple devices may include at least one computing device with a display that can implement a graphical user interface (GUI) and/or cursor (cursor according to definition below) and an instance can be used to control the computing device. As another example, the multiple devices may include at least one apparatus without a display and/or cursor (e.g., certain tablet computing devices, certain robotic devices, and the like) that may be (but does not have to be) associated with a computing device that can implement a GUI with a display and/or cursor (cursor according to definition below) and control of the apparatus can be performed using an instance implemented on the computing device with the display/cursor.

As used herein, the term "control program" relates to at least a graphical user interface (GUI) and input mechanism or graphic (e.g., a cursor, a working portion of a robotic device, or another electronically controlled physical device), and/or an input mechanism such as an external robotic mechanism moving in the real world without a GUI such as a working portion of a robotic device or another electronically controlled physical device. Instances of control programs are implemented on different devices and the different instances may be active/inactive.

As used herein, the term "instance" refers to a concrete occurrence of any object, existing usually during the runtime of a computer program, such as the control program. The instance can be active when implemented on an active device or inactive when implemented on an inactive device.

As used herein, the term "neural decoding system" relates to a controller and/or specialized hardware/software system that receives neural signals (from one or more implanted and/or external electrodes) and decodes the neural signals into a command for a device to be controlled. The neural decoding system can be associated with additional signal processing components (e.g., signal digitizers, receivers, preprocessors, computers, etc.).

As used herein, the term "command" refers to a directive to a device that includes a controller running a computer program to perform a task. As used herein a command is issued from a neural decoding device based on neural signals the neural decoding device receives from a user.

As used herein, the term "task" refers to physical or virtual work to be done or undertaken, virtual work can include, but is not limited to, running a process, step, request, or query. For example, a task can include moving an input graphic on a display screen, selecting a pixel or object with an input graphic (e.g., a virtual button), and dragging a pixel or object to a new location on the display screen.

As used herein "cursor" refers to any input graphic, internal device command, and/or implement that executes a task based on a command originating from neural signals of the user to cause a change to the device. For example, on a traditional computer (e.g., running Windows OS, Mac OS, Linux, etc.), the cursor can be a pointer input graphic that interacts with programs available on the computer to execute the task. In another example, for a touch screen device, the cursor can be internal device commands that change the display and interact with programs available on the touch screen device as if the screen were being physically touched (e.g., swiped, poked, etc.). In another example, for a robotic device, the cursor can be a working end of the robotic device that interacts with the user's physical environment to execute a task (e.g., grasp, point, step, etc.).

As used herein, the term "user" can relate to any person interacting with the BCI system via brain activity, including an individual with paralysis, a caregiver for an individual with paralysis, an able-bodied individual, or the like.

As used herein, the term "device" can be a desktop personal computer (PC), a laptop PC, a tablet PC, a mobile telephone, a robotic system that replaces, restores, rehabilitates, or enhances a natural bodily function, or the like. The device can be associated with an apparatus, in some instances. An apparatus can be a portion of the device that does not have a display and/or cursor.

II. Overview

Described herein is a single brain computer interface (BCI) system that can be implemented on multiple devices (as different instances) to control the multiple devices and methods for using the BCI system. Traditionally a BCI system is a specialized system that connects one user with one device, such as a computer or robotic arm, often under the guidance of a caretaker or secondary operator. Electrodes in, on, or near neural tissue of the user are used to detect neural signals of the user of a BCI, which are then used to command a cursor or device. Methods and systems are needed to control multiple devices, and to accommodate varying user preferences and BCI capacities for interacting with any particular device, and to map (and allow the user to assign) different BCI command outputs to the variety of functions available on different devices.

The BCI system herein can connect one user with multiple devices, such as a computer, tablet, smart telephone, and/or robotic arm, through a neural decoding system that receives neural signals from the user. The BCI system allows a user to switch between any number of device that are configured to run an instance of the BCI system's control program and/or are in communication (e.g., Bluetooth) with a device running the control program. Moreover, this BCI system gives users a previously unreachable level of independence and control of their electronics, assistive technologies, and/or surroundings by allowing them the ability to not only easily switch between control of different devices, but also to more easily and accurately control each device, choose when they are controlling the device or not, and calibrate the system on their own so as to not have to wait for a caretaker or technician operator. The BCI system includes a neural decoding system that is in communication with electrodes recording neural signals from a user of the BCI system and any number of connected devices.

III. System

Provided herein is a brain computer interface (BCI) system 10 (FIG. 1) that can be implemented as instances on multiple devices (e.g., active device 20 and one or more additional inactive devices, such as device 30-*a* and a device 30-*b* associated with an apparatus 38, but not limited to these devices or device types). It should be understood that device 20 is illustrated and explained as "active device 20", but its specific configuration is not necessary—any one of the inactive devices could be an active device. The BCI system 10 can include an active device and one or more inactive devices of any configuration.

The BCI system can perform control using the devices' native APIs. The devices can be a consumer device. Each of the devices can be running the same operating system or one or more running a unique operating system (e.g., a desktop computer running Windows, an Android tablet, Microsoft tablet, a computer/tablet/phone running iOS, a computer or embedded system device running Linux, etc.). Each device can be networked and reachable by the BCI system 10, but the devices do not need to be networked to each other necessarily. Different instances can be deployed to each different device that is desired to be controlled by the BCI system. Each instance can implement a graphical user interface overlaid on the display of the device and may include a cursor, or take control of the cursor of the device (or take control of a portion of an apparatus associated with the device). Additionally, each instance can include graphics for one or more calibration games.

The BCI system 10 can include a neural decoding system 14 that can be coupled to at least one electrode 12 (wirelessly or over a wired connection) to receive neural signals. The at least one electrode 12 can be configured to detect neural signals from neural tissue of a user of the BCI system 10. The at least one electrode 12 may be on the skull (e.g., electroencephalography (EEG) electrodes or the like), near the brain (e.g., electrocorticography (ECoG) electrodes, any electrodes recording neural signals from blood vessels on or in the brain, or the like), and/or implanted in the brain (e.g., intracortical electrodes, deep brain electrodes, or the like). The neural decoding system 14 can receive a neural signal from the at least one electrode 12 associated with a user. The neural signals are always streaming into the neural decoding system 14 once a user is connected to the neural decoding system 14. The neural decoding system 14 can perform neural signal processing operations that can decode the neural signals (e.g., using one or more neural decoding algorithms) to determine an occurrence of intended cursor movements and/or gesture commands. In some instances, the neural decoding system 14 can identify neural signals indicative of a command set apart from the occurrence of neural signals indicating rest or other actions not intended as input. When the neural signals are being decoded, the user and/or someone associated with the user can turn the decoding off when the user and/or someone associated with the user wants/needs to pause the decoding, and then restart decoding when so desired/needed. In some instances, the decoding can be probabilistic (rather than according to a threshold value for each command) and the user can select the associate sensitivity of the detection.

The devices 20, 30-*a*, 30-*b*, etc. (a number of at least two) can be connected to the neural decoding system 12 (either wirelessly or over a wired connection), and the neural decoding system 12 can send an indication of the intended cursor movement commands (e.g., position, velocity, acceleration, etc.) and/or gesture commands to the active instance of the control program on the active device 20. The operating system of the active device 20 can be affected by the control program, such as the intended cursor movement (where the control program can tie into the operating system in a way that the operating system cursor speed adjustments are bypassed) and/or gesture command in response to a signal from the neural decoding system 14. As an example, the neural decoding system 14 can decode velocity (direction and speed) from the neural data and use it to set the on-screen position of the cursor; the cursor can be moved to a position, then the velocity can be decoded and the amount of time that has elapsed since the previous time the cursor was positioned can be calculated. The velocity can be used to increment the previous position into a new position based on the elapsed time at the decoded speed and direction. Additionally, because user actions are driven by neural signals only, it should be understood that, in some instances, confirming user actions when moving a cursor (e.g., in a GUI environment, or a working end of a robot in the real world) can be critical in a BCI system 10 because neural decoding is inherently probabilistic and mathematically uncertain/imperfect, so confirmation (e.g., by a specific gesture or set of gestures) is required before a specific task (such as changing an important operation of the device or the control program itself) is undertaken. When no confirmation is received, the BCI system can revert to a previous setting on the device without performing the task. In other instances, confirmation may not be required and/or asked for (e.g., if the BCI is programmed to detect seizures and automatically suppress the seizure occurrences from the input and prevent seizure propagation).

The neural decoding system 14 is in communication (across a wired connection or a wireless connection) with at least a device 20 with an instance of the BCI system thereon and may also be in communication (across a wired connection or a wireless connection) with at least another device 30-*a*, 30-*b*, etc. with another instance of the BCI system thereon. While two devices, the device 20 and the other device 30-*a*, 30-*b*, etc. are shown in FIG. 1, a plurality of devices greater than two can be connected/in communication with the neural decoding system 14 at any given time.

The neural decoding system 14 can include a non-transitory memory 16 and a processor 18; the device 20 can include a non-transitory memory 22, a processor 24, and a display 26; and the other device 30-*a*, 30-*b*, etc. can include a non-transitory memory 32, a processor 34, and, optionally, a display 36 (e.g., a monitor, a tablet, a smartphone, a television, or another other device configured to make data comprehensible to a human via one or more senses) and optionally an apparatus 38. The device 20 and the other device 30-*a*, 30-*b*, etc. can each be, but are not limited to, a desktop personal computer, a laptop personal computer, a tablet, a smartphone, a smart television, an assistive device, a rehabilitative device, or a robotic device. The device 20 and the other device 30-*a*. 30-*b*, etc. can run the same operating system (e.g., both run on Windows OS or both run on iOS) or different operating systems from each other (e.g., the device 20 runs on Windows OS and the other device 30-*a*, 30-*b*, etc. runs on iOS).

In some instances, the non-transitory memories and the processors can be hardware devices. Software aspects that can be implemented by the associated devices can be stored as computer program instructions in the non-transitory memories. The non-transitory memories can each be any non-transitory medium that can contain or store the computer program instructions, including, but not limited to, a portable computer diskette; a random-access memory; a read-only memory; an erasable programmable read-only memory (or Flash memory); and a portable compact disc read-only memory). The computer program instructions may be executed by the processors. The one or more processors can each be one or more processors of a general-purpose computer, special purpose computer, and/or other programmable data processing apparatus. Upon execution of the computer program instructions, various functions/acts can be implemented.

Figure 2:
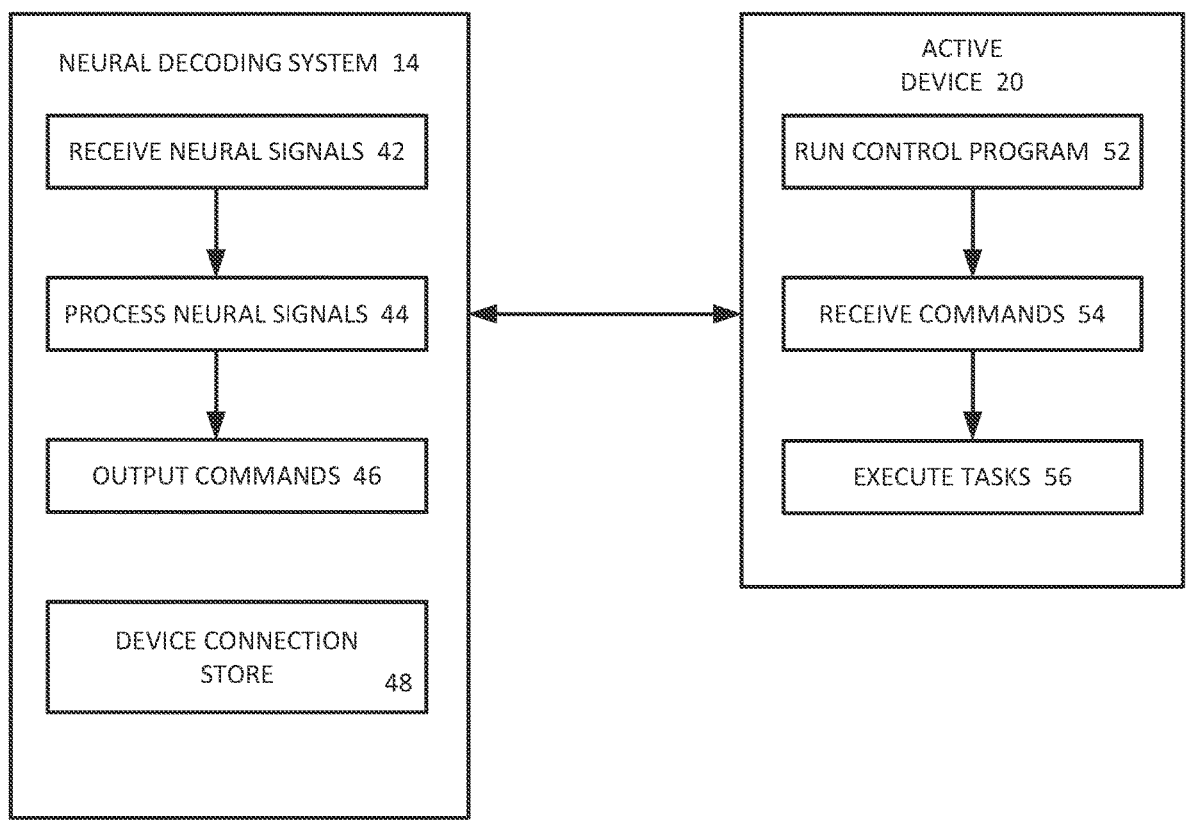
FIG. 2 shows an example implementation of a neural signal decoding system and an active instance of a control program on a device as part of the BCI system of FIG. 1.

FIG. 2 shows part of the BCI system 10, the neural decoding system 14 in communication with a device 20 running an instance of the control program of the BCI system. It should be noted that device 20 is active, but other devices (e.g., device 30-*a*, 30-*b*, etc.) may be within the BCI system 10 but inactive at a given point in time.

On any device running an instance of the control program of the BCI system, it should be noted that upon starting or initializing the instance of the control program, the instance can send out a message that is detected by all other instances in communication with at least the neural decoding system and add the new device as an available (potentially active) device. A new device coming onto the network (running an instance of the control program and in communication with the neural decoding system 14) is inserted into a list of available (potentially active) devices (e.g., connected devices). In FIG. 2, the device 20 can be the active device with the active instance of the control program. The neural decoding system 14 can include a record (or configuration file or list) containing the network or IP address of each device to be controlled and share this record with each connected device (active and inactive).

The neural decoding system 14 can receive neural signals 42 from a user of the BCI system 10, process the neural signals 44, and output a command 46 based on the processed neural signals. Additionally, the neural decoding system 14 can also store in memory 16 (not shown in FIG. 2) the list of connected devices 48, an indication of the active device, and the functions of each of the connected devices. In FIG. 2, the active device is device 20. The device 20 can be in communication with the neural decoding system 14 to receive commands and can execute instructions to run an instance of a control program 52 that can include a graphical user interface (GUI) that can cover at least a portion of the display of the device and a cursor that can interact with and act as an input for the GUI and the device. While the control program is running on the device 20, the device can receive a command 54 from the neural decoding system 14 and then execute a task 56 based on the command using the cursor and/or the GUI. The other device 30, and any number of other devices, (not shown in FIG. 2) can run other instances of the control program, and when running the other instance of the control program and in communication with the neural decoding system 14 the other device can also execute instructions to receive a command from the neural decoding system 14 and then execute a task (e.g., the task can include moving a cursor, right clicking, left clicking, scrolling up, scrolling down, zooming in or out, double tapping, toggling between other active applications, or the like) based on the command using the cursor and/or the GUI. The other device 30-*a*, 30-*b*, etc. may not include a display, in which case, the task may be executably controlled by another functional device, such a robotic device or other device that cannot be natively controlled (in some instances, requiring a Manager Mode control program, shown and described with respect to FIG. 9, that can run any of the functions and responsibilities of the instance of the BCI system's control program on the first device in Manager Mode and then communicate commands and tasks to the second device (e.g., a common communication protocol)).

In general, BCI systems require calibration, in which neural signals are mapped to intended cursor movements or actions (e.g., move the cursor, right click, left click, scroll up, scroll down, or the like). The user can independently initiate and complete a calibration process whenever desired. For example, the calibration process may be used to improve cursor control that is not ideal. Additionally, in some instances, the user can receive feedback about the quality of the recorded signals so the user can take action to ensure better reception of the neural signals (or have a caretaker or other third party take the action to ensure better reception of neural signals with an instance running on another device that can control the instance on the user's device). Additionally, calibration can remain continuous across different devices used by the user so that the calibration does not have to be redone at each new device. Calibration parameters can be stored and applied across devices or in a device specific manner if the device and the other device do require different calibration schemes (e.g., one requires 2D control and the other requires 3D control).

In one example, the task executed by the device 20 can include switching active control from the device to the other device 30-*a*, 30-*b*, etc. To execute the task to switch control the first instance of the control program on the device 20 sends an instruction (e.g., a variable) to the neural decoding system 14 and to the other device 30-*a*, 30-*b*, etc. to switch control to the other device. The neural decoding system 14 can be reconfigured to stop sending commands to the device 20 and to instead send commands to the other device 30-*a*, 30-*b*, etc. This switch of control can happen any number of times back and forth and with any combination of devices connected to the BCI system 10.

In another example, the task can include making a change to an operation of the device 20, such as changing a feature or function of the GUI or the device itself (e.g., turning the device off). In some instances, to execute the task to change an operation of the device 20 the processor of the device further executes instructions to display a confirmation graphic on the display before the change to the operation is executed. In some instances, if the control program receives a command indicating confirmation to change the operation, then the processor proceeds with the change to the operation. If the control program receives no command indication confirmation (such as within a chosen time period), then the processor does not execute the task to change the operation and the operation remains as it was. In one example, the confirmation graphic can be displayed near a location (e.g., 1 cm or less away, 2 cm or less away, 1 in or less away, 2 in or less away or the like) on the GUI where a cursor or trigger graphic is positioned for a user to more easily (and quickly) make a command indication of confirmation. The commands can be determined by the neural decoding system 14 based on the neural signals of a user that are processed (mapped) to predetermined commands. To better match the neural signals of the user with the predetermined commands, the device 20 can also execute a task 56 to have a user complete a calibration game. The user can command to start a calibration game and/or the BCI system can require the user complete a calibration game if the system recognizes a problem with the calibration. The device 20 and the neural signal decoding system 14 calibrate control of the cursor and/or GUI with the neural signals of the user based on the calibration game.

Figure 3:
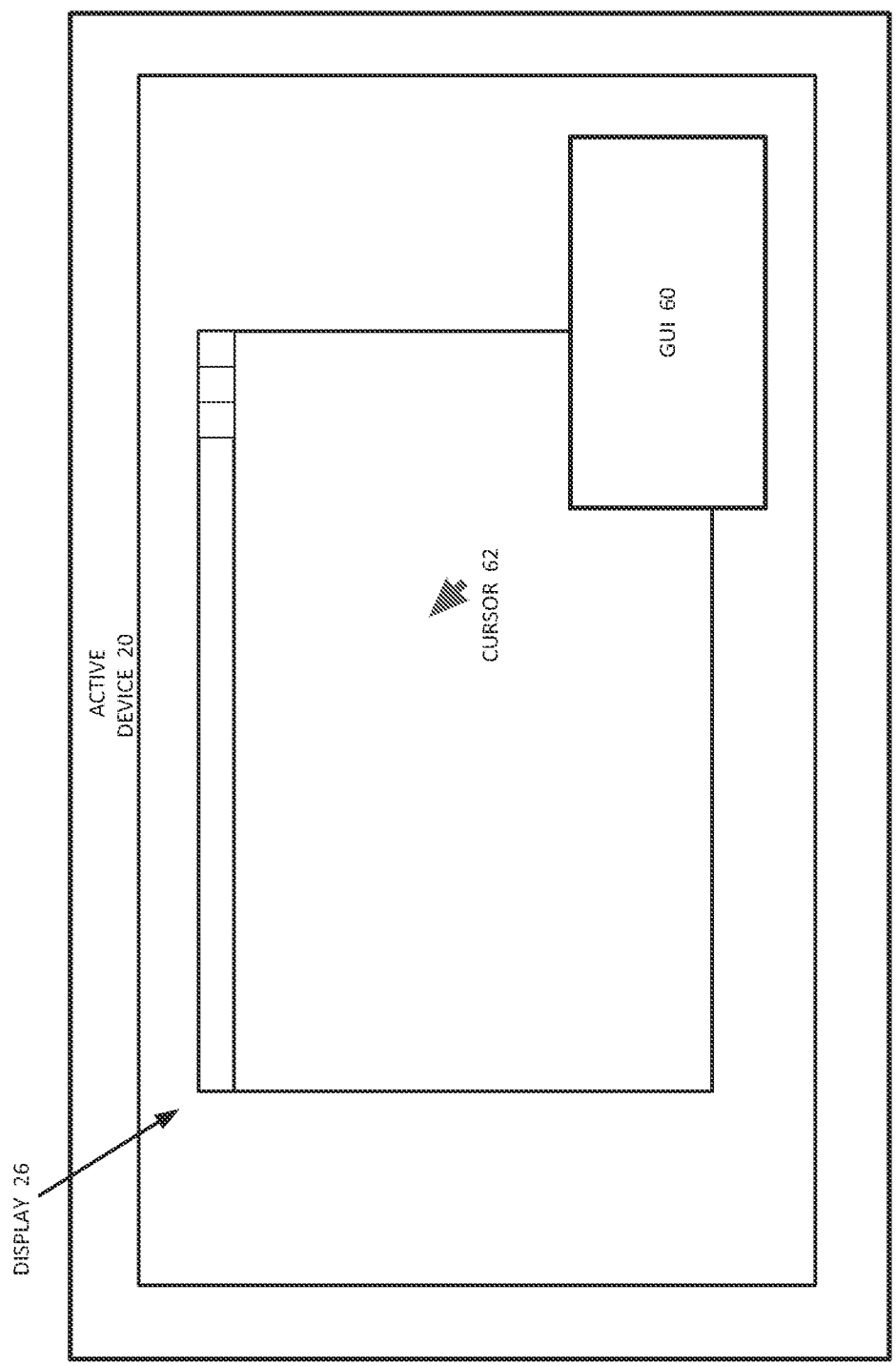
FIG. 3 shows an example of a graphical user interface (GUI) and cursor of the instance of active instance of the control program overlaying the desktop of the device of FIG. 2.

FIG. 3 shows an example display 26 of device 20 running the control program, where the GUI 60 covers (or overlays) at least a portion of the display and the cursor 62 is shown on the screen. Other instances of the control program may have a different control mechanism, but GUI 60 and cursor 62 are just an example. For example, while FIG. 3 shows an example display 26 of device 20 running the control program, where the GUI 60 covers (or overlays) at least a portion of the display that includes the cursor 62 shown on the screen it should be understood that the device 20 can include a tablet or other device that may or may not have a visible cursor. As another example an apparatus and/or the active device 20 may not include a display and/or a cursor.

Figure 4:
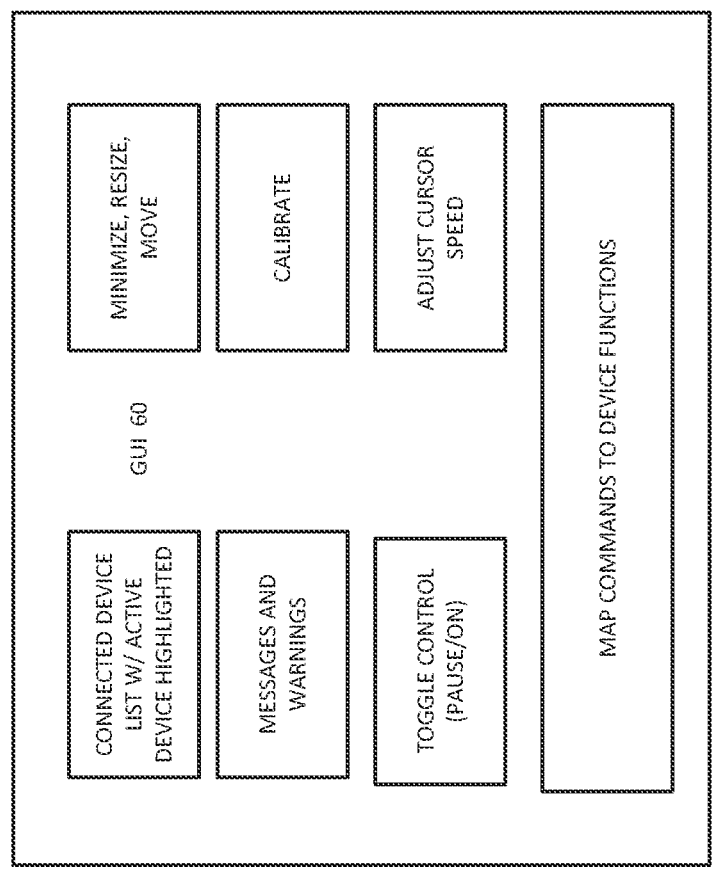
FIG. 4 shows a schematic example of the GUI produced by the active instance of the control program of FIG. 3.

The GUI 60 can be configured to always be in front of the desktop of the display 26 or any windows open on the display, but is relocatable. The control program can execute tasks on the device 20 using the GUI 60 or the cursor 62. For example, the cursor 62 can interact with other programs or windows available on the device 20 (e.g., read an e-book, view a video, search the internet, play a video game, or the like). The GUI 60 can include a plurality of data, icons, and input buttons or graphics. Exemplary functions of the GUI 60 are shown in FIG. 4. Functions can include minimizing or otherwise resizing the GUI and moving the GUI around the display 26 so no one portion of the display is always covered. The cursor speed can also be adjusted through the GUI. The GUI 60 can display, pictorially and/or with words, a list of connected devices with the device under active control highlighted in some manner. For example, the active device can be shown in color, while the other connected, but not actively controlled, devices can be shown grayed out. In other examples, the active device can be bolded, highlighted, or otherwise displayed to stand out from the not actively controlled, but still connected devices. The list of connected devices may also include an indication of the functions of each connected device.

Another function of the GUI can be to send messages and warnings to the user via at least one of visual, aural, or tactile alert. For example, the messages can include indication that another device has been connected to the BCI system or a request to confirm a command. In another example, the warnings can include a warning that something is wrong with the system (e.g., poor connection, poor signal decoding, poor calibration, etc.). In another example, the message can include information about the neural command that is being actively decoded, which can be used to inform the user if the user's efforts are being decoded correctly or incorrectly (if incorrect, then the user can attempt the neural command again). In another example, the neural command can be a part of a sequence of neural commands (e.g., 2 or more neural commands) and the message can include a timer function that can indicate how long a user must complete each neural command in the sequence of neural commands before the attempt is terminated. Another function of the GUI is to map commands from the neural decoding system 14 to functions of device 20. The user can assign (or re-assign) available decoded neural commands to the functions available on device 20. The available functions may differ between devices, and the set of decoded neural commands may differ between users. Therefore, the GUI 60 can give users the ability to choose to map various decoded neural commands to different functions, at any time after first use of device 20. Additional functions of the GUI 60 include a toggle control feature, that allows a user to pause or restart control of the device without turning the device or the system all the way off or pause and resume control of individual decodable neural commands to facilitate control of different applications on the device, a calibrate feature, so the user can independently choose to calibrate or recalibrate the BCI system for improved use, and an emergency/poor control feature that can include a dwell state command, button, or toggle to revert all buttons and/or neural command input into dwell to click and the ability to scale the widths and heights of all buttons, toggles, graphical representations up and down, etc.

IV. Method

Another aspect of the present disclosure can include methods (FIGS. 5-8) that relate to a single brain computer interface (BCI) system (shown in FIG. 1) that can be implemented on multiple devices (as unique instances of a control program that are either active or inactive) to control the multiple devices. The methods can be executed by the BCI system 10 of FIGS. 1-4. The methods 70, 80, 90, and 100 are illustrated as process flow diagrams with flowchart illustrations that can be implemented by one or more components of the BCI system 10. For purposes of simplicity, the methods 70, 80, 90, and 100 are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods 70, 80, 90, and 100.

Figure 5:
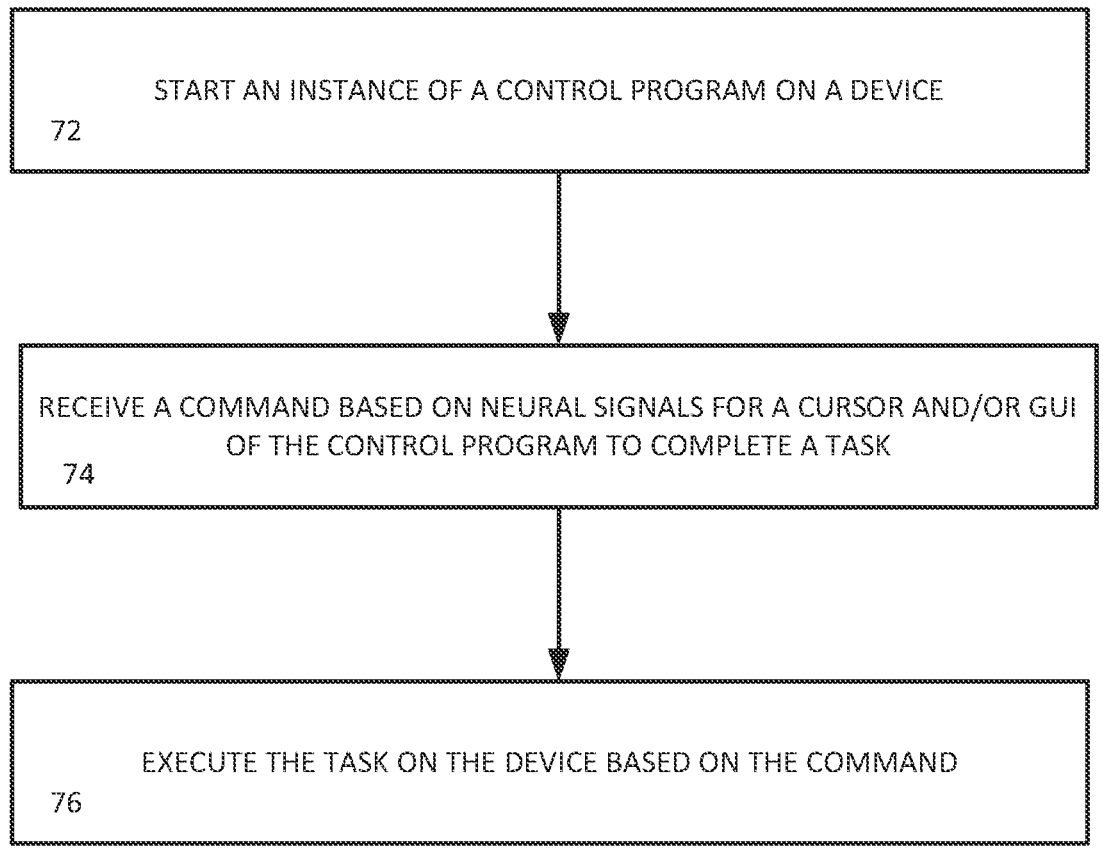
FIG. 5 shows an example process flow diagram of a method for implementing an instance of a BCI on a single device.

FIG. 5 illustrates a method 70 for implementing an instance of a BCI system with a neural decoding system and a single device to allow a user to control that device via neural signals. At 72, an instance of a control program is started on a device that is in communication with a neural decoding system that receives neural signals from a user (e.g., from electrodes on, in, and/or near neural tissue of the user). The control program includes at least a graphical user interface (GUI) and a cursor. The GUI can be displayed over at least a portion of a display screen associated with the device. The GUI may be configured to always be in front of any other programs running on the device. The cursor can be the cursor icon native to the device, but under the control of the control program (e.g., instead of a mouse). At 74, the control program running on the device receives a command from the neural decoding system. The command is for the cursor and/or the GUI to complete a task and is based on the neural signals of the user. The command can be related to at least one of neural signals of the user representing an imagined word command, such as that resulting from attempted or imagined speech, and/or an attempted or imagined gesture or movement. Optionally, word command, gesture, or movement may be attempted or completed as well as imagined. At 76, the control program executes the task on the device utilizing the cursor and/or the GUI based on the command.

Figure 6:
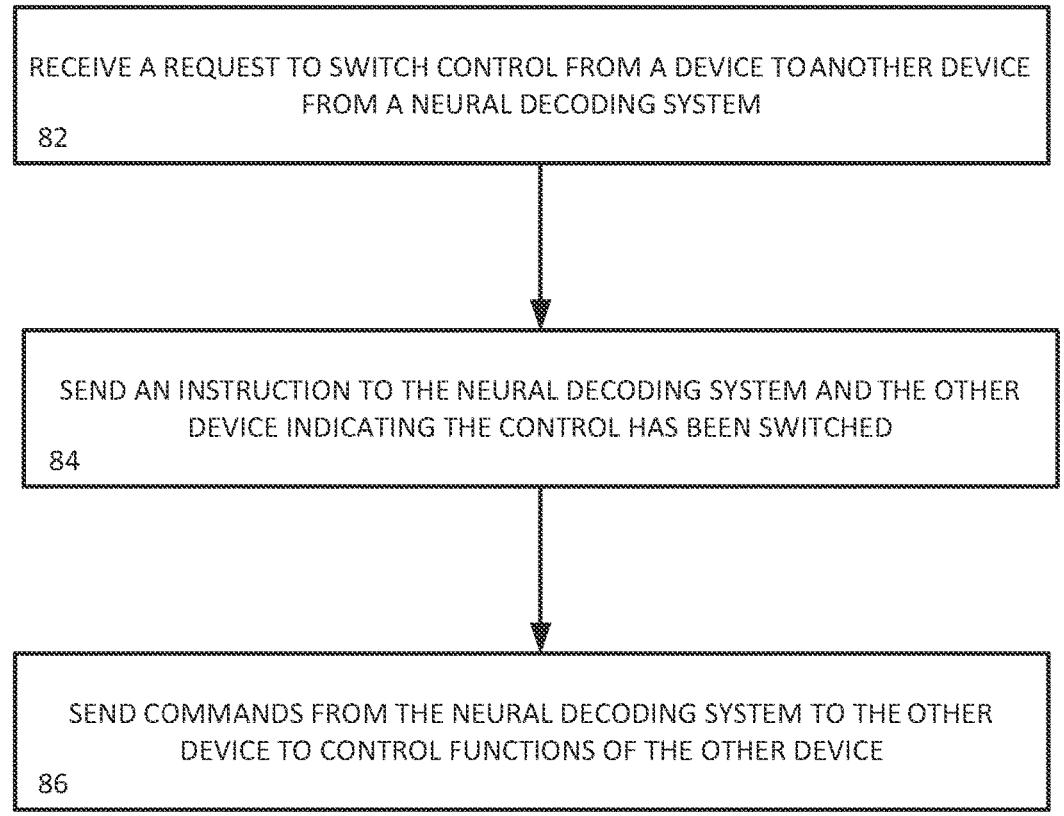
FIG. 6 shows an example process flow diagram of a method for switching from one device to another device each implementing an instance of the control program of the BCI.

FIG. 6 illustrates a method 80 for switching active control of the BCI system from one device implementing an instance of the control program of the BCI system (active instance becoming inactive) to another device implementing another instance of the control program of the BCI system (inactive instance becoming active). The other instance of the control program is started on the other device and the other device is in communication with the neural decoding system. When the other device is in communication with the neural decoding system, then the instance of the control program on the device can recognize the other instance of the control program running on the other device. For example, the control program can display, as part of the GUI, a graphic indicating what devices are connected to the BCI system and which instance of the control program is actively in control at that time.

At 82, the device receives a request to switch control from the device to the other device. For example, a user of the device can decide to switch from using a desktop personal computer to using a tablet. The request can be made by neural signal command by, non-limiting example, clicking on a non-actively controlled device on the GUI. In another example, the other device can be associated with a caregiver of the user of the device used in method 70 (e.g., device 20) and the other device can control the device when the user is unable to control the device based on the neural signals. Prior to executing a task to switch devices the user (or caregiver, an engineer, etc.) can have to confirm the desire to switch actively controlled device. At 84, an instruction is sent from the device to the neural decoding system and to the other device indicating that control has been switched to the other device. At 86, in response to the instruction, the neural decoding system stops sending commands to the device and starts sending commands to the other device to control functions and/or operations of the other device.

FIG. 7 illustrates a method 90 for implementing a task to change an operation of a device that is running the control program and is part of the BCI system. Prior to implementing a task that can change an operation of the device and/or the GUI the BCI system can require confirmation that a user actually meant to change the operation. In this way, the BCI system acts as its own safety check to decrease the number of incorrect actions (e.g., actions that do not match with the intent of the user). At 92, a command is received by the device, from the user via the neural decoding system, to change an operation of the device and/or the GUI. At 94, a confirmation graphic is displayed on a display screen associated with the device before a change is executed on the device. The confirmation graphic can remain displayed for a predetermined time period (e.g., 10 seconds, 15 seconds, or the like) waiting for a response from the user (e.g., via neural signals processed through the neural decoding system to become a command). At 96, if the device receives confirmation to execute the task, from the user via the neural decoding system, then the device proceeds with executing the change in operation. If the device does not receive confirmation to execute the task within the time period, then the device cancels the task and does not change the operation.

Operations of the device that can require a confirmation before being changed can include, but are not limited to, turning the device off, changing a required setting, or updating the device. Operations of the GUI that can require confirmation can include, but are not limited to, switching the actively controlled device, turning off/exiting the control program, pausing and restarting active control of the device, connecting a new device to the BCI system, and adjusting the cursor speed. Additionally, when a new device is connected to the BCI system then a message, indicating a new instance of the control program has been detected, can be sent, via the neural decoding system. The message can be detected by all instances of the control program communicating with the neural decoding system. The message can be displayed for a time period on the actively controlled device and/or can require confirmation from the user to disappear from the display of the active device. The GUI can also alert a user when at least one of a neural transmission signal quality input into the neural decoding system and a decoding quality of the neural decoding system is below a predetermined limit. This alert can be visual, aural, and/or tactile. Optionally the alert can require confirmation that it has been noticed before it will end. Additionally, the neural transmission signal quality and/or the decoding quality can be continuously sent from the neural decoding system and may be passively displayed by the GUI until a limit is breached.

If the neural decoding quality of the neural decoding system is below a predetermined limit, then the BCI system can automatically trigger a calibration function of the GUI. The calibration function can also be selected independently by the user (by a neural signal based command) or by a caregiver of the user or a technician of the BCI system. The calibration function executes a calibration game that calibrates commands relative to the neural signals of the user based on a request to calibrate. For example, over time, the BCI system can use machine learning techniques (and/or other learning techniques) to better map an individual user's neural signals with the predetermined commands. The calibration game can include a cursor moving between icons representative of the thoughts (e.g., imagined words and/or gestures) that create neural signals. At the beginning of the calibration game the BCI system can be controlling the movements of the cursor until the neural signals for each representative icon are mapped. After the neural signals are mapped the BCI system can cede greater control to the user, until the user is entirely controlling the movement of the cursor based on neural signals, then the calibration game is ended.

Figure 8:
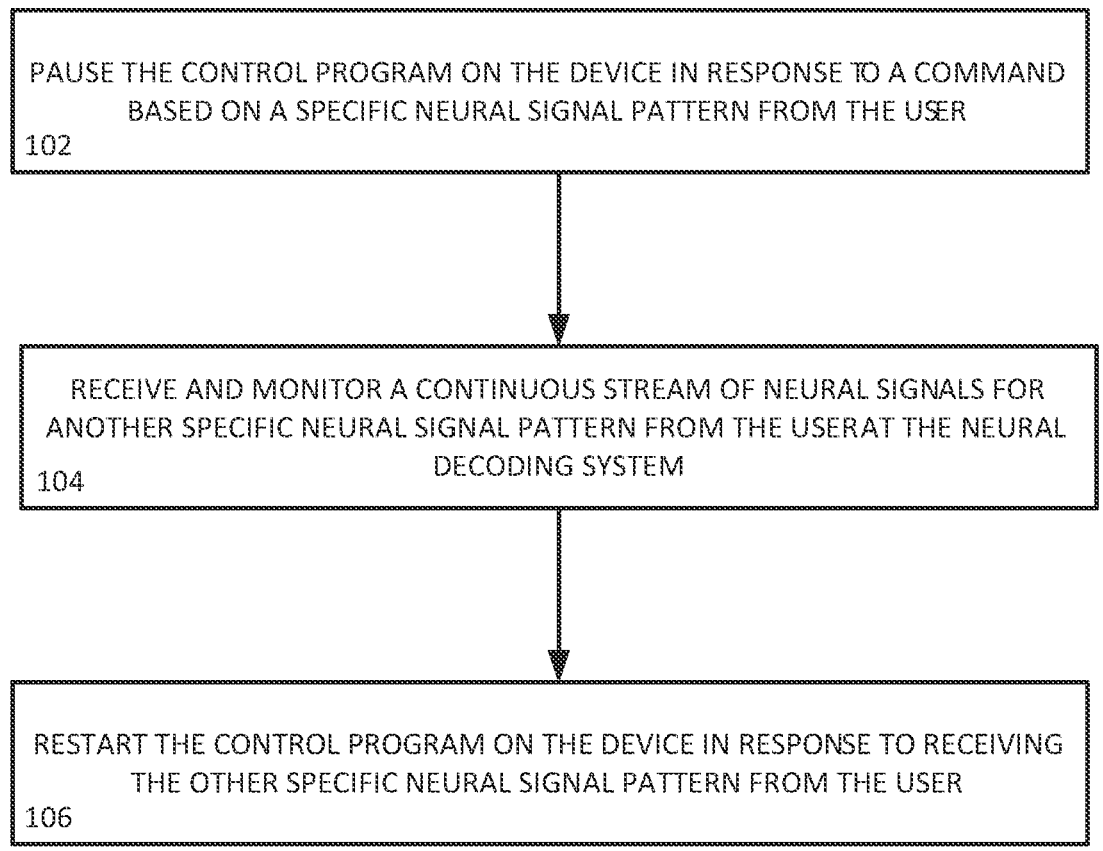
FIG. 8 shows an example process flow diagram of a method for pausing an active instance of the BCI on a device.

As discussed above, one of the features of the GUI of the BCI system is the ability to pause and restart active control of a device (e.g., toggle control on and off). FIG. 8 illustrates a method 100 for pausing and restarting active control of a controlled device in the BCI system. A user may choose to pause active control to watch a video on the device, read a website, read an e-book, or the like, or to complete another task external from the device without concern that a wayward thought could incorrectly control the device. At 102, the control program on the device is paused in response to the device receiving a command based on a specific neural signal pattern received from the user, via the neural decoding system. The specific neural signal pattern can be related to a code word or phrase or a specific movement or gesture (real or only imagined). Pausing active control of the device can require confirmation from the user. At 104, while active control of the device is paused a continuous stream of neural signals from the user are received and monitored by the neural decoding system for another specific neural signal pattern from the user (e.g., real or imagined, code word or phrase or specific gesture or movement). At 106, in response to receiving the other specific neural signal pattern from the user the control program on the device is restarted and the device is again being actively controlled by neural signals of the user.

V. Manager Mode

In one example, the BCI system 10 described above may include a Manager Mode control program where the Manager Mode control program can run on a first device and another instance of the BCI system in a normal mode can run on a second device. In this example, the second device is the actively controlled device, but many of the functions and responsibilities of the BCI system's control program described above run on the first device in Manager Mode and are then communicated to the second device (e.g., via Bluetooth®). This can be particularly useful in cases where the native operating system of the second device does not/cannot allow the BCI system to fully execute code and run concurrently with other applications. For example, when the second device is an iOS device, iOS can disallow, or prohibitively restrict, an application in the background from executing code. In order to get around such issues, Manager Mode can take over many and/or all of the run control program functions.

Figure 9:
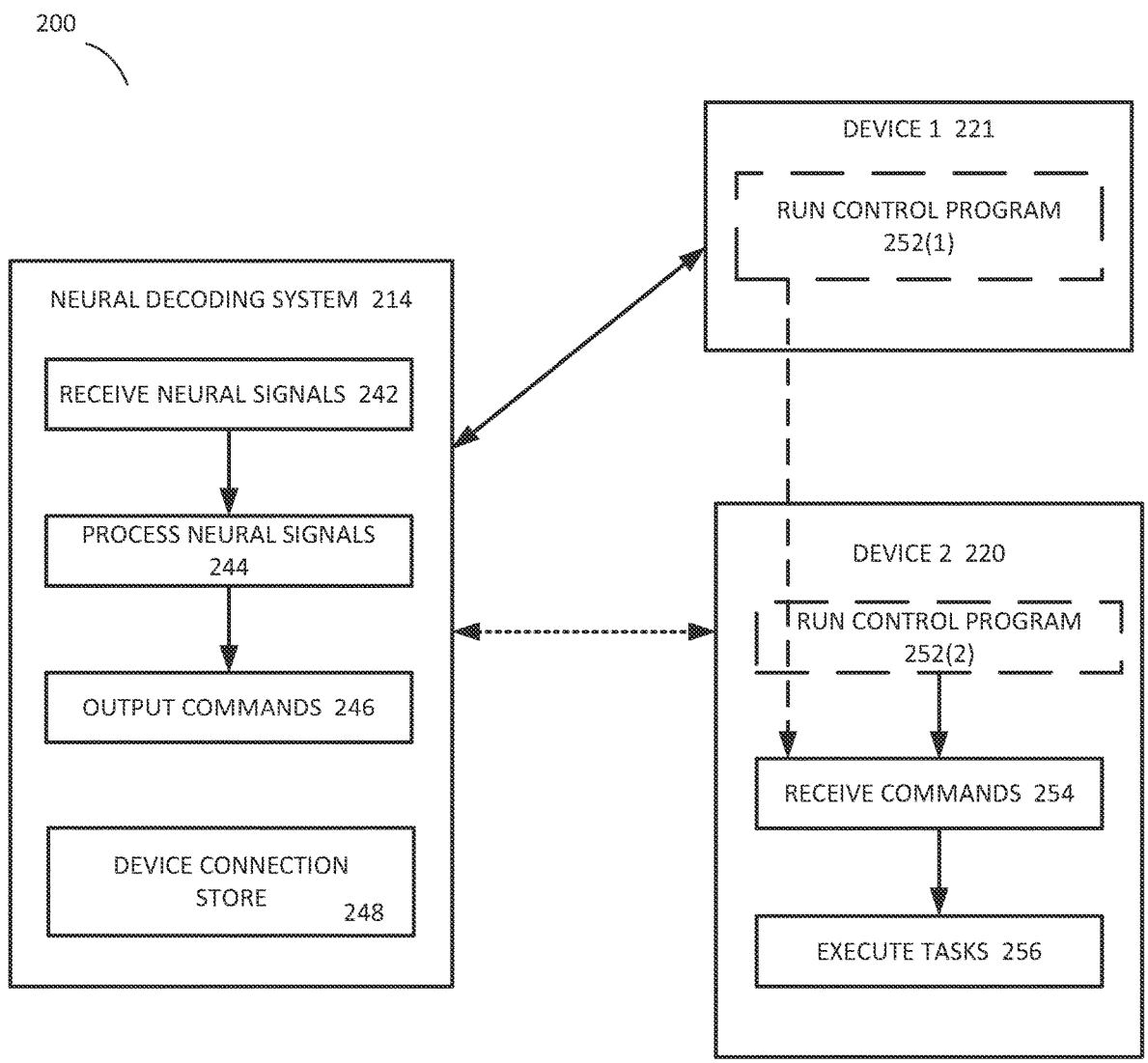
FIG. 9 shows another example implementation of the neural decoding system and other instances of a control program on devices as part of the BCI system of FIG. 1.

FIG. 9 shows an example of the BCI system 200 utilizing the Manager Mode control program. The neural decoding system 214 runs in the same manner as described above with respect to the neural decoding system 14 described with respect to FIGS. 1 and 2. The neural decoding system 214 can be in communication with a first device 221 (Device 1) that is running a first instance of the control program 252(1) in manager mode and may be in communication with a second device 220 (Device 2) that is running a normal instance of the control program 252(2). The first device 221 can be any device comprising at least a processor and a non-transitory memory (not shown), such as a computer. The second device 220 can be, for example, a tablet or other device a user chooses to control that is running an operating system that suppresses the running of control program 252(2). The first device 221 can be in communication (e.g., a serial Bluetooth® connection communication) with the second device 220. In order for a user to be able to control the second device 220 the output commands 246 (based on the received 242 and processed neural signal 244 from the user) can be communicated to the first device 221. The first device 221 can run the control program 252(1) in Manager Mode to output control signals communicated to (e.g., via Bluetooth®) to the second device 220. The second device 220 can receive the communicated signals (as received commands 254) from the control program in Manager Mode of the first device 221 and can then execute the tasks 256 associated with the commands. For example, the second device 220 can be a tablet having Bluetooth receivers and running an iOS operating system that can be controlled (e.g., select, scroll, toggle apps, etc.) by the neural decoding system 214 through the first device 221. In this example, the first device 221 running Manager Mode spoofs as a Bluetooth® mouse, the code for which is not suppressed, for the second device 220 (e.g., tasks are being executed on the second device by neural commands that are sent disguised as a Bluetooth® mouse signal). In another example, the responsibility of availability checking the list of possible active devices (discussed in more detail above) can be run on the control program instance of the first device 221 even while the active device is actually the second device 220. In a further example, the logic for toggling control of which device is controllable or not and/or switching control between available devices can be run by either the first device 221 or the neural decoding system 214 itself rather than the second device 220. If control is switched, the control signals can be communicated to another device (not shown). Centralizing logic in the control program running in Manager Mode and outputting commands via Bluetooth® can decrease the need for new code language and implementation per each new type of other device added and can generally increase the ease of communication compatibility across operating systems and device types.

V. Example Use Cases

The systems and methods described above with respect to FIGS. 1-9 describe an improvement in the control of computerized devices for people with disabilities that keep people with disabilities from utilizing computer devices in the traditional manner (e.g., quadriplegics, paralysis victims, patients with severe spasticity disorders, etc.). Such users can use the system and methods described herein to control computerized devices with only cognitive (neural) commands and easily and readily switch between different devices for different purposes. An example illustration of a user using a computer and then switching to using a tablet through solely mental commands is shown in FIG. 10.

Figure 10:
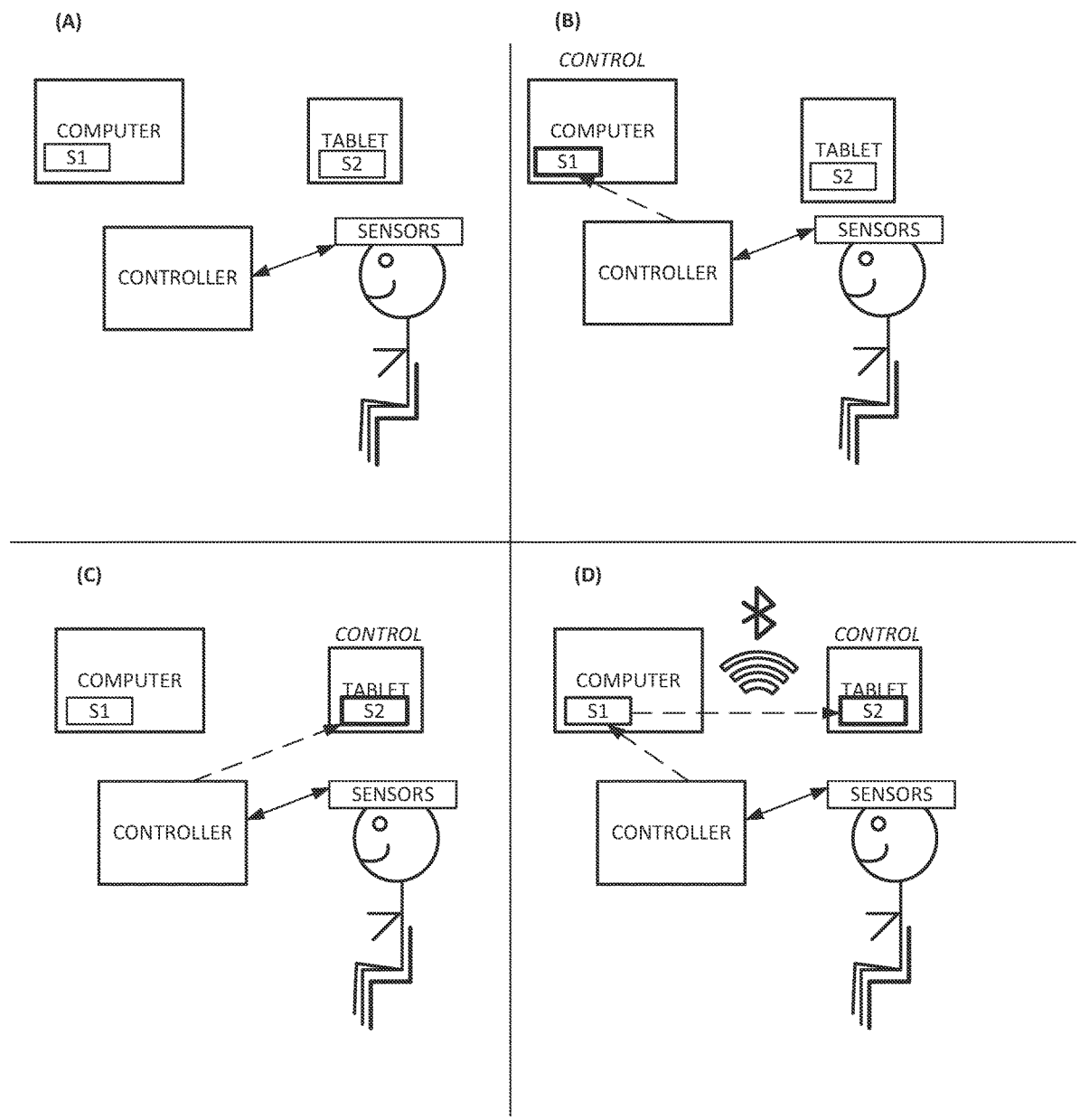
FIG. 10 shows an illustration of a user using the BCI system of FIG. 1 to transfer an active instance of the control program between devices.

FIG. 10, element A, shows a user wearing and/or implanted with electrodes (Sensors) that are in communication with a neural decoding system (Controller). The user has both Computer running software S1 and Tablet running software S2 to choose between. For example, the user may use the Computer for browsing the internet, sending emails, or work related activities and the Tablet for watching movies and/or TV or reading a book. FIG. 10, element B, shows the user choosing to use the Computer for one or more activities. The neural commands of the user are detected by the Sensors and sent to the Controller where they are received and processed to commands that are sent to the software S1 which is active on the Computer. FIG. 10, elements C and D show the user choosing to the use the Tablet for one or more activities. The user can choose to switch control between Computer and Tablet as often as desired. FIG. 10, element C, shows an example where the software S2 on the Tablet is in direct communication with the controller. FIG. 10, element D, shows an example where the software S2 on the Tablet is in communication with software S1 in Manager mode, as described above, on the Computer and the Computer is in direct communication with the Controller.

From the above description, those skilled in the art will perceive improvements, changes and modifications. Such improvements, changes and modifications are within the skill of one in the art and are intended to be covered by the appended claims. All patents, patent applications, and publications cited herein are incorporated by reference in their entirety.

What is claimed is:

1. A method comprising:
    starting an instance of a control program on a device, wherein the device is in communication with a neural decoding system that receives neural signals from a user;
    receiving, from the neural decoding system, a command to complete a task, wherein the command is based on the neural signals;
    determining whether the device is active;
    when the device is active, executing the task on the device based on the command;
    starting another instance of the control program on another device, wherein the other device is in communication with the neural decoding system that receives neural signals from the user;
    receiving, from the neural decoding system, a request to switch control from the device to the other device;
    switching, by the neural decoding system, control from the device to the other device;
    sending, from the device, an instruction to the neural decoding system and the other device indicating control is switched;
    receiving, from the neural decoding system, another command to complete another task, wherein the other command is based on the neural signals;
    determining whether the other device is active; and
    when the other device is active, executing the other task on the other device based on the other command.

2. The method of claim 1, wherein the command and/or the other command is related to at least one of neural signals of the user representing an imagined word command and/or an imagined gesture.

3. The method of claim 1, wherein the other device is controllable by a caregiver of the user and the other device is configured to control the device when the user is unable to control the device based on the neural signals.

4. The method of claim 1, wherein the other device is in communication with the neural decoding system and the instance of the control program on the device recognizes the other instance of the control program running on the other device, wherein the other device is inactive.

5. The method of claim 4, wherein the control program displays a graphic indicating which instance of the control program is actively in control.

6. The method of claim 1, wherein the instance of the control program displays a GUI and/or a cursor over at least a portion of a display screen associated with the device.

7. The method of claim 1, further comprising:
    displaying a confirmation graphic on a display screen associated with the device before a change is executed on the device.

8. The method of claim 1, further comprising executing a calibration game to calibrate commands relative to the neural signals based on a request to calibrate.

9. The method of claim 1, further comprising sending a message that is detected by all instances of the control program communicating with the neural decoding system when a new instance of the control program is detected.

10. The method of claim 1, further comprising alerting a user when at least one of a neural signal quality input into the neural decoding system and a decoding quality of the neural decoding system is below a predetermined limit.

11. The method of claim 1, further comprising:
    pausing the control program on the device in response to receiving a command based on a specific neural signal pattern received from the user;
    receiving and monitoring, at the neural decoding system, a continuous stream of neural signals for another specific neural signal pattern from the user; and
    restarting the control program on the device in response to receiving the other specific neural signal pattern from the user.

12. A system comprising:
    a neural decoding system configured to receive neural signals from a user, process the neural signals, and output commands based on the processed neural signals;
    a device in communication with the neural decoding system to receive the at least one command and comprising a display, a non-transitory memory storing instructions, and a processor to execute the instructions to: run an instance of a control program, wherein the instance of the control program is configured to communicate with the neural decoding system and execute tasks of the device in response to the commands; and
    another device in communication with the neural decoding system, wherein the other device comprises: a non-transitory memory storing instructions, and a processor to execute the instructions to: run another instance of the control program, wherein the other instance of the control program is configured to communicate with the neural decoding system and execute tasks of the other device in response to the commands,
    wherein one of the instance of the control program and the other instance of the control program is active at a time, wherein only the active instance of the control program receives commands and performs the tasks associated with the commands,
    wherein when the active instance of the control program is run on the device and receives a switch command based on neural signals indicating the user wants to switch the active instance of the control program to the other device:
        the active instance of the control program on the device sends an instruction to the neural decoding system to switch control to the other instance of the control program on the other device, and
        the neural decoding system reconfigures to stop sending commands to the instance of the control program on the device and to send commands to the other instance of the control program on the other device.

13. The system of claim 12, further comprising:
    at least one electrode in communication with the neural decoding system and configured to be positioned in, on, and/or near neural tissue of the user to detect the neural signals from the user.

14. The system of claim 12, wherein the device and the other device are each one of a desktop personal computer, a laptop personal computer, a tablet, a smartphone, a smart television, an assistive device, a rehabilitation device, or a robotic device.

15. The system of claim 12, wherein the device runs an operating system and the other device operates another operating system different from the operating system.

16. The system of claim 12, wherein the neural decoding system further comprises a memory configured to store a list of connected devices, an indication of the active device, and the functions of each of the connected devices.

17. The system of claim 12, wherein one of the tasks of the device or the other device further comprises making a change to an operation of the device or the other device, wherein the instructions further comprise:

display a confirmation graphic display before the change to the operation is executed; and if the control program receives a command indicating confirmation, proceed with the change to the operation, and if the control program receives no command indicating confirmation, do not execute the task.

18. The system of claim 12, wherein one of the tasks of the device or the other device further comprises a calibration game and the neural signal decoding system and the device or the other device work together to calibrate control of at least a portion of the device or the other device based on the neural signals of the user received during the calibration game.

\* \* \* \* \*